US009495225B2

(12) United States Patent
Jacobi et al.

(10) Patent No.: US 9,495,225 B2
(45) Date of Patent: Nov. 15, 2016

(54) PARALLEL EXECUTION MECHANISM AND OPERATING METHOD THEREOF

(71) Applicant: International Business Machines Corporation, Armonk, NY (US)

(72) Inventors: Christian Jacobi, Poughkeepsie, NY (US); Marcel Mitran, Ontario (CA); Moriyoshi Ohara, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 14/061,775

(22) Filed: Oct. 24, 2013

(65) Prior Publication Data

US 2014/0115249 A1    Apr. 24, 2014

(30) Foreign Application Priority Data

Oct. 24, 2012   (JP) ................................ 2012-234293

(51) Int. Cl.
| G06F 3/00 | (2006.01) |
| G06F 9/45 | (2006.01) |
| G06F 9/52 | (2006.01) |
| G06F 9/30 | (2006.01) |

(52) U.S. Cl.
CPC ............. *G06F 9/528* (2013.01); *G06F 9/3009* (2013.01); *G06F 9/30087* (2013.01)

(58) Field of Classification Search
CPC ..................... G06F 13/1605; G11C 11/40603
See application file for complete search history.

(56) References Cited

U.S. PATENT DOCUMENTS

| 8,151,252 B2 | 4/2012 | Song et al. |
| 2009/0217253 A1* | 8/2009 | Song ........................ G06F 8/456 717/161 |
| 2009/0292884 A1* | 11/2009 | Wang .................. G06F 9/30189 711/147 |
| 2011/0209155 A1* | 8/2011 | Giampapa ............... G06F 9/467 718/103 |

(Continued)

FOREIGN PATENT DOCUMENTS

| JP | 2009521767 A | 6/2009 |
| JP | 2010532053 A | 9/2010 |
| WO | WO2010001736 | 1/2010 |

OTHER PUBLICATIONS

Jeffrey Thomas Oplinger,"Enhancing Software Reliability with Speculative Threads", Graduate Studies of Stanford University, Aug. 2004.

(Continued)

*Primary Examiner* — Hyun Nam
(74) *Attorney, Agent, or Firm* — Cantor Colburn LLP; David Quinn

(57) ABSTRACT

A thread priority control mechanism is provided which uses the completion event of the preceding transaction to raise the priority of the next transaction in the order of execution when the transaction status has been changed from speculative to non-speculative. In one aspect of the present invention, a thread-level speculation mechanism is provided which has content-addressable memory, an address register and a comparator for recording transaction footprints, and a control logic circuit for supporting memory synchronization instructions. This supports hardware transaction memory in detecting transaction conflicts. This thread-level speculation mechanism includes a priority up bit for recording an attribute operand in a memory synchronization instruction, a means for generating a priority up event when a thread wake-up event has occurred and the priority up bit is 1, and a means for preventing the CAM from storing the load/store address when the instruction is a non-transaction instruction.

8 Claims, 4 Drawing Sheets

(56) References Cited

U.S. PATENT DOCUMENTS

2012/0204163 A1* 8/2012 Marathe .............. G06F 8/4442
717/151
2013/0111175 A1* 5/2013 Mogul .................. G06F 13/16
711/167

OTHER PUBLICATIONS

Ruben Titos, Manuel E. Acacio, Jose M. Garcia,"Speculation-Based Conflict Resolution in Hardware Transaction Memory", Parallel & Distributed Processing, 2009. IPDPS 2009. IEE.

* cited by examiner

PARALLEL EXECUTION MECHANISM AND OPERATING METHOD THEREOF

CROSS-REFERENCE TO RELATED APPLICATION

This application claims priority under 35 U.S.C. §119 from Japanese Patent Application No. 2012-234293 filed Oct. 24, 2012, the entire contents of which are incorporated herein by reference.

BACKGROUND OF THE INVENTION

The present invention relates to a hardware mechanism for performing thread-level speculative parallel execution.

In real time transaction applications, response time is one of the most important indicators to customers. However, response times depend largely on the single thread performance of the processor. In recent years, however, the growth rate of single-thread performance is slowing down.

Thread-level speculative parallel execution is one well-known response. Thread-level speculative parallel execution speeds up the execution of single-thread programs by allowing a compiler or programmer to speculatively parallelize a single-thread program. This typically requires a complicated hardware mechanism.

Hardware transaction memory is one technique used to speed up execution. In hardware transaction memory, a transaction is a sequence of instructions between special instructions such as transaction begins and transaction end. When a data access conflict occurs between two transactions being executed in parallel such as read-after-write, write-after-write, and read-after-read conflicts, the hardware cancels the execution of the transaction.

However, thread-level speculative parallel execution cannot be performed by the hardware transaction memory alone. Thread-level speculative parallel execution requires the completion of transactions in order. However, the runtime for controlling the completion order causes transaction conflicts.

The following prior art technologies are known to be related to this.

Laid-open Patent Publication No. 2009-521767 describes software transaction memory (STM) access processing which is executed when the preceding hardware transaction memory (HTM) access processing fails.

Laid-open Patent Publication No. 2010-532053 describes the use of transaction memory hardware to facilitate the updating of a dispatch table in a multi-thread environment utilizing an atomic commit function. Here, an emulator uses a dispatch table stored in the main memory to convert a guest program counter to a host program counter.

PCT Publication No. WO2010/001736 describes a multi-processor system including a plurality of processors for executing multi-threads in the processing of data, and a data processing control unit for determining satisfactory conditions allowing the processors to execute the threads in order, and for starting the execution of each thread so as to satisfy these conditions.

U.S. Pat. No. 8,151,252 describes the speculative parallelization of a program using transactional memory by scoping program variables during compilation, and by inserting code into the program during compilation. In this technique, the scoping is determined based on whether a scalar variable being scoped is involved in inter-loop non-reduction data dependencies, whether the scalar variable is used outside the loop defining it, and at what point in a loop the scalar variable is defined.

Architecture based on thread-level speculation is presented in Jeffrey Thomas Oplinger," Enhancing Software Reliability with Speculative Threads", Graduate Studies of Stanford University, August 2004. A programmer can use this to add monitoring code for checking the execution of a program. This architecture mitigates speed reductions when the monitoring code is executed speculatively in parallel with the main computations. In order to recover from an error, the programmer can define transactions with fine granularity. Side effects of these transactions are committed or aborted via program control. These transactions are implemented efficiently via thread-level hardware support.

A hybrid conflict management mechanism is presented in Ruben Titos, Manuel E. Acacio, Jose M. Garcia," Speculation-Based Conflict Resolution in Hardware Transaction Memory", Parallel & Distributed Processing, 2009. IPDPS 2009. IEEE International Symposium on 23-29 May 2009. In hardware transaction memory, this hybrid conflict management mechanism uses a mechanism with an enthusiastic policy as the base, but combines the advantages of an enthusiastic policy with a lazy policy to allow many conflict-prone transactions to coexist.

SUMMARY OF THE INVENTION

A process for detecting and addressing conflicts in hardware transaction memory has been disclosed in the prior art literature, but the literature does not suggest a mechanism for enabling thread-level speculative parallel execution when the completion of transactions in order has been requested.

Therefore, it is an object of the present invention to provide a mechanism enabling thread-level speculative parallel execution to be performed in hardware transaction memory.

In the present invention, speculative parallel execution is performed on a sequential program composed of a plurality of blocks which may have a dependency with each other by using hardware transaction memory to detect conflicts and to recover from mistaken speculative execution.

In one aspect of the present invention, a thread-level speculation mechanism is provided which has content-addressable memory, an address register and a comparator for recording transaction footprints, and a control logic circuit for supporting CAD (compare and delay) instructions. This supports hardware transaction memory in detecting transaction conflicts. This thread-level speculation mechanism includes a priority up bit for recording an attribute operand in a CAD instruction, a means for generating a priority up event when a thread wake-up event has occurred and the priority up bit is 1, and a means for preventing the CAM from storing the load/store address when the instruction is a non-transaction instruction.

The transaction of the application program raises the priority in response to a priority up event.

The present invention provides a thread priority controlling mechanism which uses the completion event of the preceding transaction to raise the priority of the next transaction in the order of execution when the transaction status has been changed from speculative to non-speculative. This reduces the amount of wasted resources due to speculative failure.

DETAILED DESCRIPTION OF THE PREFERRED EMBODIMENTS

Figure 1:
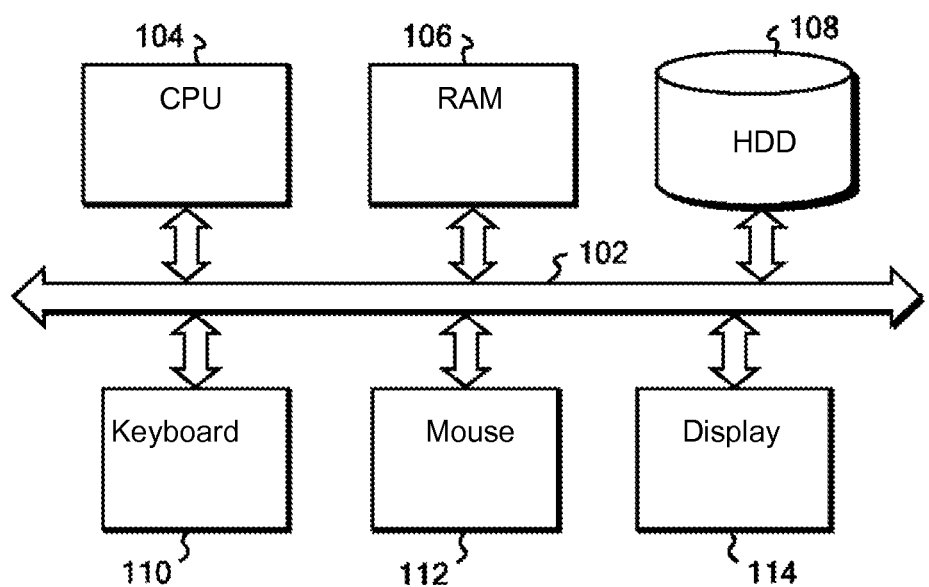
FIG. 1 is a diagram showing the hardware configuration for a computer system embodying the present invention.

The following problems related to hardware transaction memory occur in the prior art.

A transaction has to be completed in order in order to maintain the semantics of the original program.

Threads in a transaction cannot communicate with other threads without stopping the transaction.

When a block is the earliest of all the blocks in a given sequence of instructions, the block is non-speculative.

While CPU resources are divided evenly between speculatively executed blocks and non-speculatively executed blocks when a simultaneous multi-threading (SMT) processor executes multiple blocks in parallel, the allocation of resources should favor the non-speculatively executed blocks.

In order to enable thread-level speculative execution in hardware transaction memory so as not to cause conflict between transactions, the runtime for non-transactional instructions should allow the transactions to be completed in order.

The present invention provides a thread priority controlling mechanism which uses the completion event of the preceding transaction to raise the priority of the next transaction in the order of execution when the transaction status has been changed from speculative to non-speculative. This reduces the amount of wasted resources due to speculative failure.

The following is an explanation of embodiments of the present invention with reference to the drawings. The embodiments are used to explain preferred embodiments of the present invention, and are not intended to limit the scope of the invention in any way. In the drawings, identical objects are denoted by the same numbers unless otherwise indicated.

FIG. 1 is a block diagram of computer hardware used to realize the system configuration and processing in an embodiment of the present invention. The computer hardware is preferably configured according to the IBM™ System z™ architecture.

In FIG. 1, a CPU 104, main memory (RAM) 106, a hard disk drive (HDD) 108, a keyboard 110, a mouse 112, and a display 114 are connected to a system bus 102. The CPU 104 is preferably based on the architecture of the z10™ processor chip with modifications related to the present invention. In other words, the CPU 104 is a multi-core processor including a cache memory, fetch unit, decode unit, register file, arithmetic unit, load/store unit, transaction memory control circuit, and other logic circuits and control circuits. In the present invention, a z10™ transaction memory control circuit is added. More specifically, a modification has been made to the CAD (compare and delay) instruction executing unit. The hardware modifications will be explained in greater detail below with reference to FIG. 3.

Preferably, the main memory 106 has a capacity of at least 16 GB. The capacity of the hard disk drive 108 can be, for example, 1 TB.

While not shown in the drawing, the operating system is stored in the hard disk drive 108. The operating system can be any operating system compatible with the computer hardware, such as z/OS, z/VM or z/VSE.

The keyboard 110 and mouse 112 are used to load programs in the main memory 106 from the hard disk drive 108, operate the program displayed on the display 114 (not shown) and enter text according to the functions of the operating system.

The display 114 is preferably a liquid crystal display. Any resolution can be used, including XGA (resolution: 1024× 768) or UXGA (resolution: 1600×1200). While not shown in the drawings, the display 114 is used to display numerical values such as accounting data calculated using a COBOL program.

Figure 2:
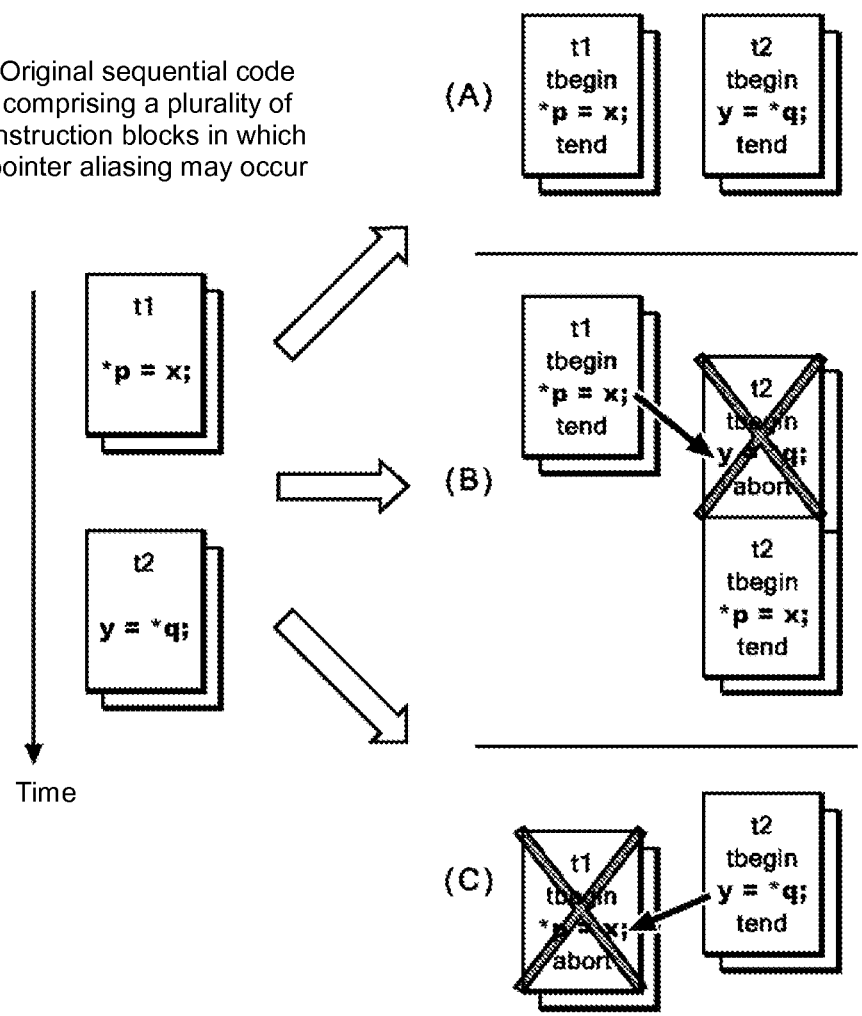
FIG. 2 is a diagram showing an example of a transaction conflict occurring during thread-level speculation parallel execution processing in the prior art.

Before explaining the configuration of the present invention in greater detail, the problem of the prior art will be explained with reference to FIG. 2. This problem relates to the difficulty of controlling the completion order in thread-level speculation parallel execution using hardware transaction memory (HTM). FIG. 2 thread-level speculation parallel execution is performed on sequential code consisting of multiple instruction blocks (t1 and t2). Here, pointer aliasing may occur, that is, the same pointer may be accessed from multiple locations. In order to obtain correct results, t2 has to be executed after t1.

At this time, as shown in the drawing, the following three scenarios are possible.

(A) Pointer aliasing does not occur. In other words, p≠q.
In this scenario, t1 and t2 may be performed in parallel as a transaction without a conflict occurring.

(B) Pointer aliasing occurs (p=q), and t1 is completed before t2.
In this scenario, the HTM detects a read-after-write, and allows t2 to be executed again.

(C) Pointer aliasing occurs (p=q), and t2 is completed before t1.
In this scenario, the HTM detects a write-after-read, and t1 is aborted. However, t1 cannot be executed again in order to obtain the correct result.

The following is an explanation of a memory synchronization (CAD) instruction. This instruction takes as operands register R1, base address register B2, and memory displacement value D2. The total value of value D2 and value B2 is the memory address, and the execution of subsequent instructions is delayed until the value of the memory at the memory address equals the value in the register R1.

Figure 3:
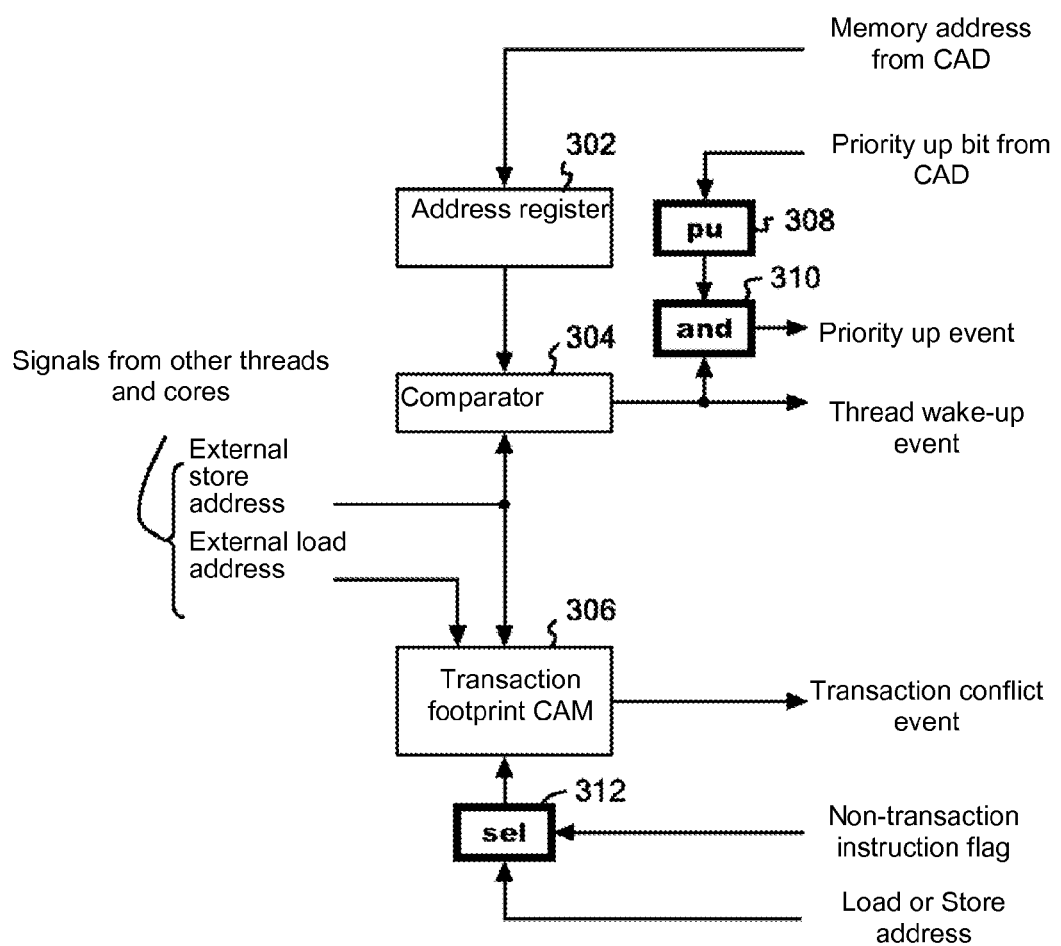
FIG. 3 is a diagram showing an example of a hardware logic configuration embodying the present invention.

The following is an explanation, with reference to FIG. 3, of the hardware modifications to the execution unit for memory synchronization (CAD) instructions in the embodiment of the present invention.

The original configuration to be modified has an address register 302, a comparator 304, and content-addressable memory (CAM) 306. The content-addressable memory 306 keeps track of the transaction footprints (the cache line accessed in the transaction) to detect any transaction conflicts.

The content-addressable memory 306 receives external store addresses and external load addresses from other threads and cores. An event notification is issued when a data access conflict occurs between transactions (read-after-write, write-after-write, and read-after-read conflicts).

The address register 302 stores a memory address from the CAD. The comparator 304 compares an external store address from another thread or core with the content of the address register 302, and issues a thread wake-up event notification when there is a match.

Only the prior art configuration has been described so far. The following logic circuits are added to this configuration in the example of the present invention.

(1) A priority up bit (pu) 308 from an additional operand to track an attribute of the memory synchronization instruction.
(2) A control logic circuit (and) 310 for generating a priority up event when a thread wake-up event has occurred, and the pu bit is 1.
(3) A control logic circuit (sel) 312 to prevent the content-addressable memory 306 from storing a load/store address when the non-transaction flag is 1, that is, when the instruction is a non-transaction instruction.

When the memory synchronization instruction is a non-transaction instruction, the flag is set at 1. The added configurational elements are depicted using thick lines in FIG. 3.

In this configuration, CAD is used as the non-transaction instruction for synchronization, and the runtime maintains the completion of transactions in order. The following example is written using a System/z assembler. In this code, CAD is understood to be CAD with functions modified in accordance with the present invention.

```
typedef struct_tran_t{
    int cont; int pad1[sizeof(cacheline)/sizeof(int)-1];} tran_t;
tran_t TRAN[NUM_THREADS];    // one cache line per thread
TRAN_N: TBEGIN       //TBEGIN lowers priority of this thread
    JNZ TABORT_N
    LAR2,TRAN[N]     //R2=&(TRAN[N].cont); load the address of
a synch. word
    LHI R1,1
    CAD R1,PU,(R2)   //TRAN[N].cont!=1 Therefore, thread does not
                     stop.
                     //TRAN[N].cont is initialized by 0 (N>0).
                     //This means a PU (priority up) attribute added to
each cache line.
    <mainbody>       // Body of Nth speculative thread.
    LHI R1,0
    CAD R1,PU,(R2)   //if TRAN[N].cont==0, stop; (non-transaction cap)
    NTLG R4,0(R2)    //R4=TRAN[N].cont; (non-transaction load)
    LHI R1,1
    CR R4,R1
    JNZABORT_N       //if TRAN[N].cont!=1, abort; (e.g., timeout)
    TEND
    LHI R1,1         // TRAN_(N+1) is assumed to continue.
    ST R1,256+(R2)   //TRAN[N+1].cont=1; increase the priority of the
next thread.
    ...
ABORT_N:
TABORT_N: ...       // Delay the next try, optional logic
    J TRAN_N        // Retry the transaction.
```

In this code, the initial CAD indicates the synchronization word, and a priority up attribute is simply added to the cache line indicated by the memory operand (R2).

The thread executes the CAD instruction again after the thread has completed the execution of the main body of the transaction. The thread continues the execution process if another thread has already completed the execution of the preceding transaction. Otherwise, the thread stops the execution process until the other thread has completed the execution of the preceding transaction. Next, the thread loads the value of the synchronization word by using a non-transaction load (NTLG) in order to verify the completion of the preceding transaction.

Here, the non-transaction instructions (CAD and NTLG) are essentially used in a single transaction. An ordinary (transaction) instruction causes a read-after-write conflict, and the transaction is aborted.

Figure 4:
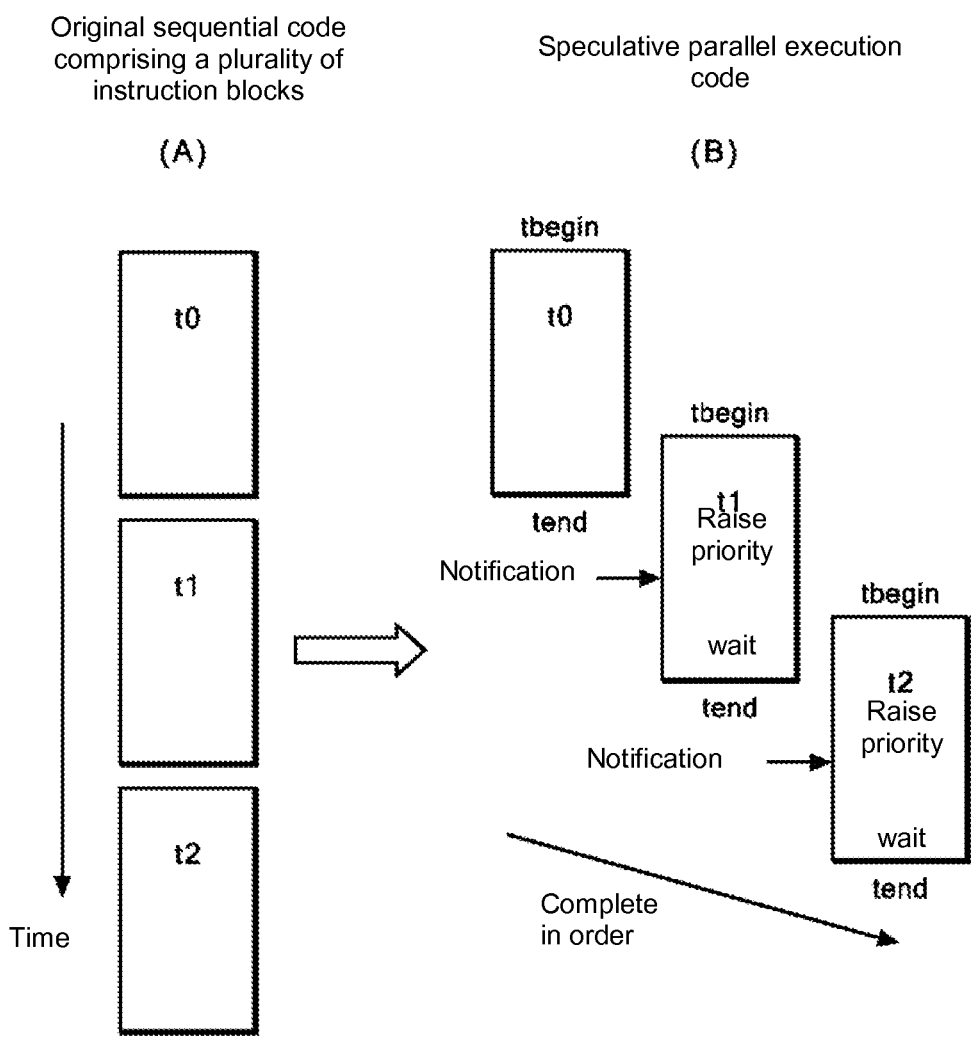
FIG. 4 is a diagram used to explain the operations of the present invention.

FIG. 4 is a schematic diagram of the processing. In this diagram, sequential code (A) is executed as speculative parallel execution code (B).

In speculative parallel execution code (B), the wait operation waits for a notification from the preceding thread using a non-transaction instruction in order to keep the notification process from causing a transaction conflict.

'Priority up' indicates raising the priority of a thread in response to a notification from the preceding thread.

The 'tbegin' instruction and 'tend' instruction refer, respectively, to transaction begin and transaction end.

The present invention was explained above with reference to a particular example in which CAD instructions in System/z were used. However, the present invention is not limited to this particular CPU architecture, but can be applied to any instructions used in inter-thread synchronization or memory synchronization. In other words, the instruction for which the present invention modifies the hardware is not limited to CAD, but also includes other memory synchronizing instructions such as BUSYWAIT.

The invention claimed is:

1. A thread-level speculation mechanism for supporting inter-thread synchronization in a transaction memory system, the thread-level speculation mechanism comprising:
    a content-addressable memory;
    an address register and a comparator;
    a control logic circuit for supporting non-transaction memory access instructions;
    means for recording a memory address and an attribute operand of a non-transaction memory access instruction;
    means for detecting an access event to the memory address; and
    means for generating a priority up event in response to detection of the access event when the attribute operand of the non-transaction memory access instruction indicates a thread-execution priority rise.

2. The mechanism according to claim 1, wherein the content-addressable memory has a means for preventing the recording of a memory address when the instruction is a non-transaction memory access instruction.

3. The mechanism according to claim 1, wherein the non-transaction memory access instruction includes an inter-thread synchronization instruction and a non-transaction load instruction.

4. The mechanism according to claim 3, wherein the inter-thread synchronization instruction is a memory synchronization instruction.

5. A thread-level speculation method for supporting inter-thread synchronization in a transaction memory system, the thread-level speculation method comprising:
    recording a memory address and an attribute operand of a non-transaction memory access instruction;
    detecting an access event to the memory address; and
    generating a priority up event in response to detection of the access event when the attribute operand of the non-transaction memory access instruction indicates a thread-execution priority rise.

6. The method according to claim 5, further comprising preventing the content-addressable memory from recording a memory address when the instruction is a non-transaction memory access instruction.

7. The method according to claim 5, wherein the non-transaction memory access instruction includes an inter-thread synchronization instruction and a non-transaction load instruction.

8. The method according to claim 7, wherein the inter-thread synchronization instruction is a memory synchronization instruction.

\* \* \* \* \*